US008112026B2

(12) United States Patent
Matsumoto et al.

(10) Patent No.: US 8,112,026 B2
(45) Date of Patent: Feb. 7, 2012

(54) LUBRICANT APPLYING DEVICE, AND IMAGE FORMING ASSEMBLY AND IMAGE FORMING APPARATUS WHICH EMPLOY THE SAME

(75) Inventors: Mitsuhiro Matsumoto, Kanagawa (JP); Tsutomu Sugimoto, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 508 days.

(21) Appl. No.: 12/323,719

(22) Filed: Nov. 26, 2008

(65) Prior Publication Data

US 2009/0324310 A1 Dec. 31, 2009

(30) Foreign Application Priority Data

Jun. 26, 2008 (JP) ................................ P2008-166866

(51) Int. Cl.
*G03G 21/00* (2006.01)
*B60S 1/28* (2006.01)

(52) U.S. Cl. ....... 399/346; 399/343; 399/347; 15/256.5; 15/256.51; 15/256.52

(58) Field of Classification Search .................. 250/346, 250/343, 347; 15/256.5, 256.51, 256.52; 399/346, 343, 347
See application file for complete search history.

(56) References Cited

U.S. PATENT DOCUMENTS

| | | | | |
|---|---|---|---|---|
| 7,212,777 | B2 * | 5/2007 | Takada et al. | 399/350 |
| 7,826,786 | B2 * | 11/2010 | Suda et al. | 399/346 |

FOREIGN PATENT DOCUMENTS

| | | | |
|---|---|---|---|
| JP | 11-024351 | | 1/1999 |
| JP | 11-212372 | | 8/1999 |
| JP | 2000-321915 | | 11/2000 |
| JP | 2000-347534 | | 12/2000 |
| JP | 2001-100491 | | 4/2001 |
| JP | 2002-006671 | | 1/2002 |
| JP | 2007-65100 | | 3/2007 |
| JP | 2007-121622 | * | 5/2007 |
| JP | 3979616 | | 7/2007 |
| JP | 2009-047782 | * | 3/2009 |

* cited by examiner

*Primary Examiner* — David Porta
*Assistant Examiner* — Mindy Vu
(74) *Attorney, Agent, or Firm* — Morgan, Lewis & Bockius LLP

(57) ABSTRACT

A lubricant applying device that faces a rotatable body, and that applies a solid lubricant to the rotatable body, includes: a lubricating roll in which the solid lubricant for application is formed into a circular sectional shape around a rotatable support shaft, and that is contacted with the rotatable body; and a pressing mechanism that presses the lubricating roll toward the rotatable body, wherein the lubricating roll that is pressed against the rotatable body by the pressing mechanism applies the lubricant in a state where the lubricating roll is not rotated relative to the rotatable body, and, when a rotational torque due to the contact with the rotatable body exceeds a predetermined value, the lubricating roll is rotated in accordance with rotation of the rotatable body.

15 Claims, 17 Drawing Sheets

CHARACTERISTIC MODEL DIAGRAM OF TORQUE LIMITER

STATIC TORQUE VALUE (TS) : TORQUE VALUE AT INSTANT WHEN TORQUE LIMITER SLIPS (STATIC FRICTION TORQUE)
DYNAMIC TORQUE VALUE (TM) : TORQUE VALUE DURING SLIPPING (DYNAMIC FRICTION TORQUE)
TORQUE RIFFLE VALUE (TR) : VARIATION AMOUNT OF DYNAMIC TORQUE VALUE DURING SLIPPING (TORQUE UNEVENNESS)

| | |
|---|---|
| RT(MAX) | :ROTATIONAL TORQUE IN INITIAL STATE OF LUBRICATING ROLL |
| RT(MIN) | :ROTATIONAL TORQUE AT END OF LIFE OF LUBRICATING ROLL |
| ΔRT | :INCREMENT OF ROTATIONAL TORQUE IN INCORPORATION OF FOREIGN SUBSTANCE |
| RTA(MAX) | :RT(MAX) + ΔRT |
| RTA(MIN) | :RT(MIN) + ΔRT |
| TS | :RESTRAINING TORQUE OF TORQUE LIMITER |

*FIG. 16*

USE CONDITIONS FOR SETTING LUBRICATING ROLL TO RESTING STATE

| Item | Value | Unit |
|---|---|---|
| Axial length of lubricating roll | 328 | mm |
| Contact width between lubricating roll and photosensitive member | 2 | mm |
| Radius of lubricating roll | 7 | mm |
| Radius of support shaft of lubricating roll | 3 | mm |
| μ (coefficient of friction) between lubricating roll and photosensitive member | 0. 1 | - |
| μ (coefficient of friction) when foreign substance (toner) is incorporated | 0. 4 | - |
| μ (coefficient of friction) when foreign substance (paper dust) is incorporated | 0. 5 | - |
| μ (coefficient of friction) when foreign substance (carrier) is incorporated | 0. 9 | - |
| Own weight of lubricating roll in pressing direction (support shaft + torque limiter) | 116. 2 | gf |
| Own weight of lubricating roll in pressing direction (solid lubricant) | 41. 5 | gf |
| Pressing spring of lubricating roll (both sides) | 170 | gf |
| Pressing force of lubricating roll (total) | 327. 7 | gf |
| Restraining torque (torque limiter) | 90 | gf·cm |
| Rotational torque (normal state) | 21 | gf·cm |
| Rotational torque (Abnormal state 1/foreign substance: toner) | 82 | gf·cm |
| Rotational torque (Abnormal state 2/foreign substance: paper dust) | 103 | gf·cm |
| Rotational torque (Abnormal state 3/foreign substance: carrier) | 185 | gf·cm |

FIG. 17

| Radius of lubricating roll 0. 7(cm) | | | | | |
|---|---|---|---|---|---|
| Pressing force of pressing spring (gf) | Total weight (gf) \ μ | Rotational torque (gf • cm) | | | |
| | | Normal state | Abnormal state 1 | Abnormal state 2 | Abnormal state 3 |
| | | 0. 1 | 0. 2 | 0. 5 | 0. 9 |
| 400 | 557. 7 | 39. 0 | 78. 1 | 195. 2 | 351. 4 |
| 600 | 757. 7 | 53. 0 | 106. 1 | 265. 2 | 477. 4 |
| 800 | 957. 7 | 67. 0 | 134. 1 | 335. 2 | 603. 4 |

| Radius of lubricating roll 0. 4(cm) | | | | | |
|---|---|---|---|---|---|
| Pressing force of pressing spring (gf) | Total weight (gf) \ μ | Rotational torque (gf • cm) | | | |
| | | Normal state | Abnormal state 1 | Abnormal state 2 | Abnormal state 3 |
| | | 0. 1 | 0. 2 | 0. 5 | 0. 9 |
| 400 | 523. 5 | 20. 9 | 41. 9 | 104. 7 | 188. 4 |
| 600 | 723. 5 | 28. 9 | 57. 9 | 144. 7 | 260. 4 |
| 800 | 923. 5 | 36. 9 | 73. 9 | 184. 7 | 332. 4 |

| Radius of lubricating roll 0. 3(cm) | | | | | |
|---|---|---|---|---|---|
| Pressing force of pressing spring (gf) | Total weight (gf) \ μ | Rotational torque (gf • cm) | | | |
| | | Normal state | Abnormal state 1 | Abnormal state 2 | Abnormal state 3 |
| | | 0. 1 | 0. 2 | 0. 5 | 0. 9 |
| 400 | 516. 2 | 15. 5 | 31. 0 | 77. 4 | 139. 4 |
| 600 | 716. 2 | 21. 5 | 43. 0 | 107. 4 | 193. 4 |
| 800 | 916. 2 | 27. 5 | 55. 0 | 137. 4 | 247. 4 |

LUBRICANT APPLYING DEVICE, AND IMAGE FORMING ASSEMBLY AND IMAGE FORMING APPARATUS WHICH EMPLOY THE SAME

CROSS-REFERENCE TO RELATED APPLICATIONS

This application is based on and claims priority under 35 USC 119 from Japanese Patent Application No. 2008-166866 filed on Jun. 26, 2008.

BACKGROUND

1. Technical Field

The present invention relates to a lubricant applying device, and an image forming assembly and image forming apparatus which employ the lubricant applying device.

2. Related Art

Image forming apparatuses having a mechanism for applying a solid lubricant to an image carrier have been proposed.

SUMMARY

According to an aspect of the invention, there is provided a lubricant applying device that faces a rotatable body, and that applies a solid lubricant to the rotatable body, the device including: a lubricating roll in which the solid lubricant for application is formed into a circular sectional shape around a rotatable support shaft, and that is contacted with the rotatable body; and a pressing mechanism that presses the lubricating roll toward the rotatable body, wherein the lubricating roll that is pressed against the rotatable body by the pressing mechanism applies the lubricant in a state where the lubricating roll is not rotated relative to the rotatable body, and, when a rotational torque due to the contact with the rotatable body exceeds a predetermined value, the lubricating roll is rotated in accordance with rotation of the rotatable body.

BRIEF DESCRIPTION OF THE DRAWINGS

Exemplary embodiments of the present invention will be described in detail based on the following figures, wherein:

FIG. 16 is a diagram showing use conditions for setting the lubricating roll which is used in Example 1, to a resting state; and FIG. 17 is a diagram showing rotational torques in a normal state and Abnormal states 1 to 3 which act on a lubricating roll under conditions used in Example 2.

DETAILED DESCRIPTION

Summary of Exemplary Embodiments

First, a summary of exemplary embodiments of an image forming apparatus, which is an example of the present invention, will be described with reference to FIGS. 1A, 1B, 2A, and 2B.

An image carrier is exemplified in the following embodiments as an object of application of lubricant, but the object may not be limited thereto. Any rotatable body may be the object of application of lubricant.

Figure 1A:
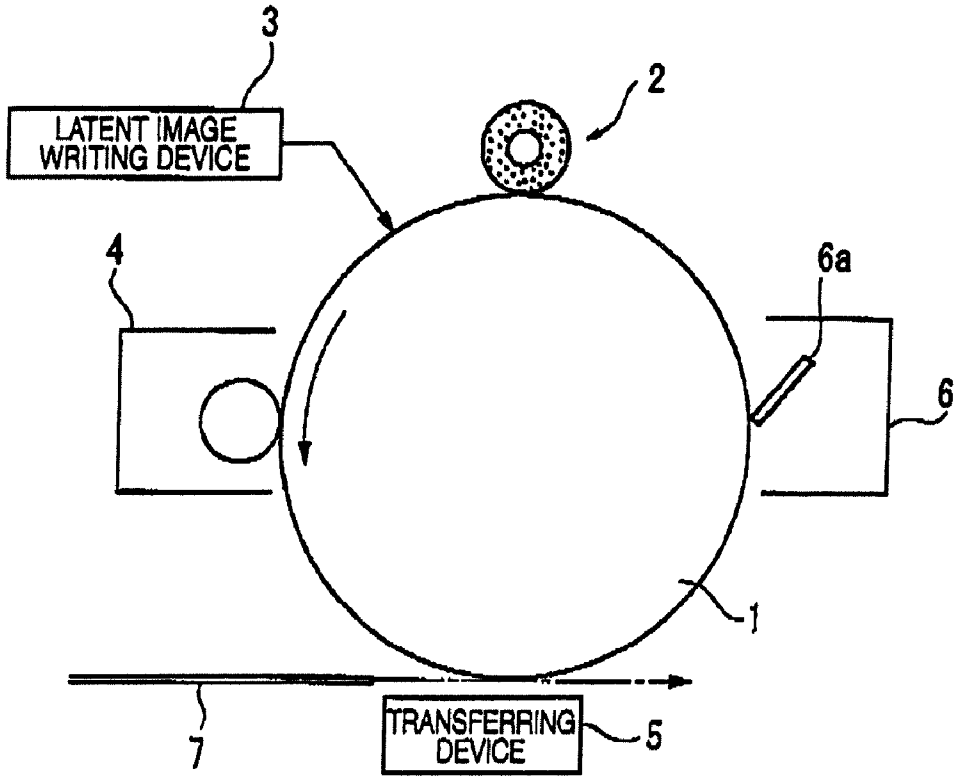
FIG. 1A is a diagram schematically showing an exemplary embodiment of an image forming apparatus to which the invention is applied.

Referring to FIG. 1A, the image forming apparatus includes an image carrier 1 which can hold a toner image, and a lubricant applying device 2 which faces the image carrier 1, and which applies a solid lubricant to the image carrier 1.

In the technical means, any one of a photosensitive member, a dielectric member, and the like may be adequately selected as the image carrier 1 as far as it can hold a toner image, and the image carrier 1 may have any shape such as a drum-like shape or a belt-like shape.

In the case where the image forming system using the image carrier 1 employs the electrophotographic method or the electrostatic recording method, for example, an image forming apparatus is used which, as shown in FIG. 1A, includes: a latent image writing device 3 which writes an electrostatic latent image onto the image carrier 1; a developing device 4 which makes the electrostatic latent image formed on the image carrier 1 to a visible image by a toner; a transferring device 5 which transfers the toner image on the image carrier 1 to a sheet 7 that is a recording member; and a cleaning device 6 which has a cleaning member 6*a* that is contacted with the image carrier 1, and which cleans the image carrier by scraping off a foreign substance remaining on the image carrier 1 by the cleaning member 6*a*.

The latent image writing device 3 is a device which performs an operation of writing an electrostatic latent image, and which is configured by, for example, a combination of a charging device and an exposing device, or alternatively may be a device which directly writes an electrostatic latent image by an ion stream.

The developing device 4 may be any device which can visualize an electrostatic latent image on the image carrier 1 by means of a toner. As a developer, a two-component developer containing a toner and a carrier, a single-component developer mainly consisting of a toner, or the like is used.

FIG. 1A shows the transferring device 5 which transfers the toner image on the image carrier 1 to the sheet 7 that is a recording member. However, the invention is not restricted to this, and can be applied also to a mode where an intermediate transferring member which intermediately holds the toner image on the image carrier 1 before the image is transferred to the recording member.

Furthermore, FIG. 1A shows the mode where the cleaning device 6 uses the cleaning member 6*a* to clean the image carrier by scraping off a foreign substance remaining on the image carrier 1 by the cleaning member 6*a*. However, the invention is not restricted to this, and can be applied also to a mode where a cleaning member having a brush-like shape or a roll-like shape is used separately or together with the cleaning member 6*a*.

In the exemplary embodiment, the lubricant applying device 2 may be disposed separately from and independently of the image carrier 1, or alternatively the image carrier 1 and the lubricant applying device 2 may be configured as an image forming assembly in which at least the image carrier and the apparatus are detachably attached to a casing of the image forming apparatus.

Figure 1B:
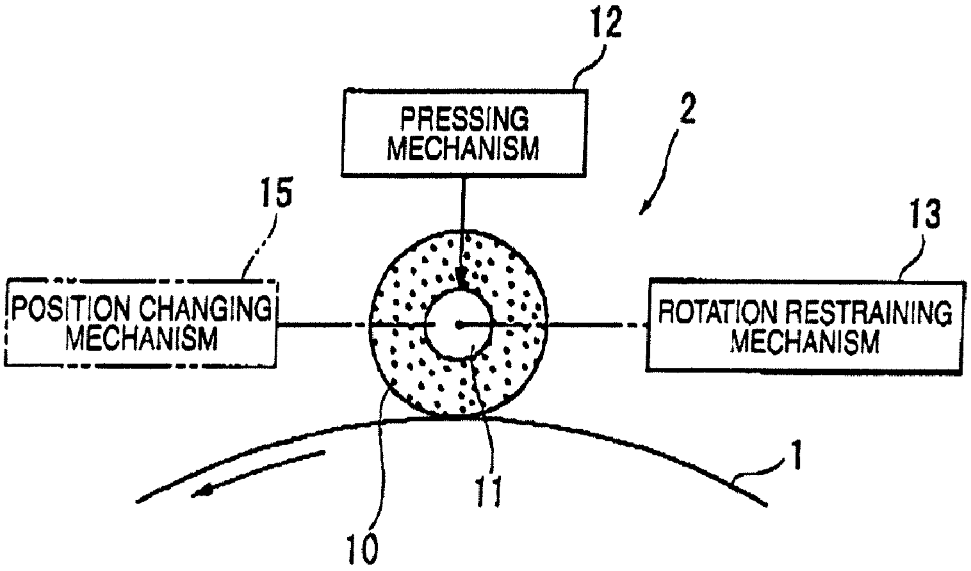
FIG. 1B is a diagram schematically showing a lubricant applying device in FIG. 1A.

As shown in FIG. 1B, the lubricant applying device 2 which is used in the exemplary embodiment includes: a lubricating roll 10 in which a solid lubricant for application is formed into a circular sectional shape around a rotatable support shaft 11, and which is contacted with the image carrier 1; a pressing mechanism 12 which presses the lubricating roll 10 toward the image carrier 1; and a rotation control mechanism 13 which, when the rotational torque about the support shaft 11 of the lubricating roll 10 that is pressed against the image carrier 1 by the pressing mechanism 12 is lower than a predetermined rotational torque TS, restrains rotation of the lubricating roll 10, and, when the rotational torque is equal to or higher than the predetermined rotational torque TS, causes the lubricating roll 10 to be rotated in accordance with rotation of the image carrier 1.

The lubricating roll 10 is requested to have a mode where the solid lubricant is formed into a roll-like shape around the support shaft 11. As the solid lubricant, any one of a wide variety of known materials such as ZnSt may be employed.

As the pressing mechanism 12, any configuration including a mechanism which presses the lubricating roll 10 may be adequately selected. In the case where the own weight of the lubricating roll 10 is used, for example, a support shaft receiving portion is disposed in a member of supporting the lubricating roll 10 so that the own weight of the lubricating roll functions as a pressing force.

A rotational torque which is produced around the support shaft 11 of the lubricating roll 10 when a foreign substance such as a toner, a carrier, or paper dust is incorporated into the contact portion between the lubricating roll 10 and the image carrier 1 may be examined by experiments or the like. In the rotation control mechanism 13, then, "predetermined rotational torque" may be predetermined.

Figure 2A:
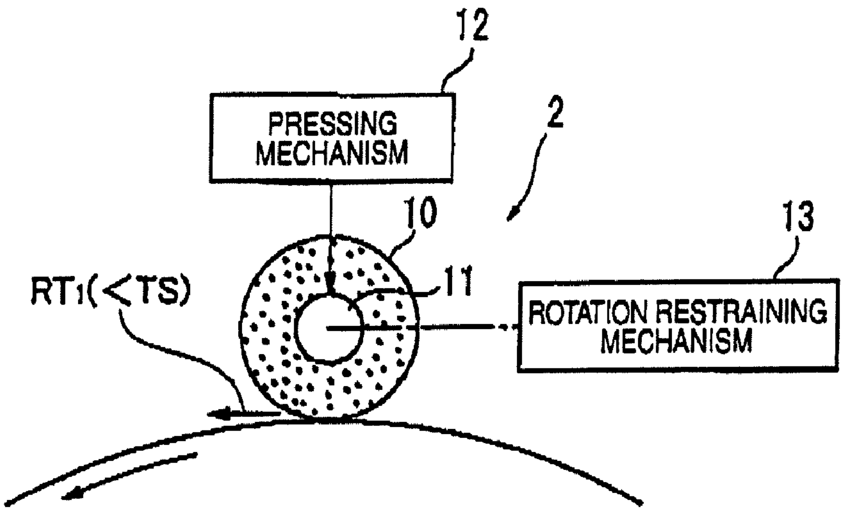
FIG. 2A is a diagram showing an operation example of the lubricant applying device in the case where the rotational torque acting on a lubricating roll is lower than a restraining torque of a rotation control mechanism.
Figure 2B:
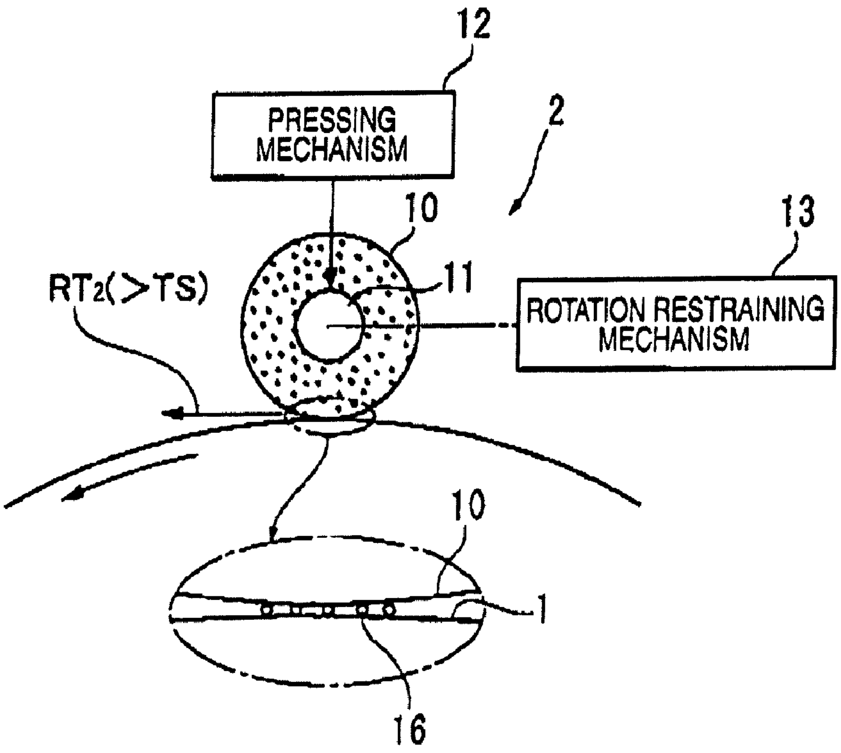
FIG. 2B is a diagram showing an operation example of the lubricant applying device in the case where the rotational torque acting on the lubricating roll is equal to or higher than the restraining torque of the rotation control mechanism.

According to the exemplary embodiment, as shown in FIG. 2A, in the state where a rotational torque $RT_1$ which is lower than the predetermined rotational torque TS acts, the rotation control mechanism 13 restrains rotation of the lubricating roll 10, and therefore the lubricating roll 10 is maintained in a resting state and the solid lubricant is applied to the surface of the image carrier 1. By contrast, as shown in FIG. 2A, in the state where a rotational torque $RT_2$ which is equal to or higher than the predetermined rotational torque TS acts, the lubricating roll 10 is caused to be rotated in accordance with rotation of the image carrier 1. Therefore, the foreign substance 16 which is incorporated into the contact portion between the image carrier 1 and the lubricating roll 10 is moved together with rotation of the lubricating roll 10, and discharged from the contact portion.

In the technical means, a typical mode of the pressing mechanism 12 is a mechanism which presses the lubricating roll 10 by the own weight or a pressing spring.

A preferred mode of the pressing mechanism 12 is a mechanism which suppresses a change of the pressing force irrespective of consumption of the solid lubricant of the lubricating roll 10. Here, the term "suppresses a change of the pressing force" includes a mode where the pressing force is constant, and also that where the pressing force is slightly changed. It is requested only that the pressing force is maintained substantially constant.

A preferred structure of supporting the lubricating roll 10 has a mode where the support shaft 11 of the lubricating roll 10 is movable along the pressing direction of the pressing mechanism 12.

A typical mode of the rotation control mechanism 13 is a torque limiter which is incorporated in the support shaft 11 of the lubricating roll 10. The torque limiter which is used as the rotation control mechanism 13 is not restricted to a limiter in which the coil spring system is employed, and may be a limiter in which any one of various known systems is employed.

In the case where the contact portion between the image carrier 1 and the lubricating roll 10 is biased to one portion, the image forming apparatus may include a position changing mechanism 15 which makes the contact portion of the lubricating roll 10 with respect to the image carrier 1 variable. The position changing mechanism 15 may be manually operated, or may automatically perform the position changing operation at a predetermined timing.

In a preferred mode of the configuration where the position changing mechanism 15 is added, moreover, the configuration may include a position detector which can detect the rotational position of the lubricating roll 10. According to this mode, the position detector can know the rotational position of the lubricating roll 10. At this time, in the case where a rotational torque which is equal to or higher than the predetermined rotational torque acts on the lubricating roll 10, for example, the lubricating roll 10 is rotated in accordance with rotation of the image carrier 1. The rotational position of the lubricating roll 10 can be selectively changed only in the case where the lubricating roll 10 is in a non-rotation state for a long term.

The position where the lubricant applying device 2 is disposed may be adequately selected as far as the position is in the periphery of the image carrier 1. From the viewpoint that the foreign substance 16 on the image carrier 1 is hardly incorporated into the contact portion between the image carrier and the lubricating roll 10, it is preferable to dispose the lubricant applying device downstream from at least the cleaning member 6*a* of the cleaning device 6 in the moving direction of the image carrier 1, and it is more preferable to dispose the lubricant applying device upstream from an electrostatic latent image writing position of the latent image writing device 3, in the moving direction of the image carrier 1.

A lubricant layer is formed on the surface of the image carrier 1 by the lubricant applying device 2. In a layout where the lubricant layer passes through a transferring portion of the transferring device 5, even when the sheet 7 that is a recording member is transported to the transferring portion of the transferring device 5, the talc component of the sheet 7 is contacted with the lubricant layer of the image carrier 1. Therefore, the talc component of the sheet 7 is little transferred toward the image carrier 1. Consequently, the situation where the talc component of the sheet 7 is transferred toward the image carrier 1 to affect disturbance of a toner image hardly occurs.

Hereinafter, the invention will be described in more detail with reference to exemplary embodiments shown in the accompanying drawings.

Exemplary Embodiment 1

—Summary of Image Forming Apparatus—

Figure 3:
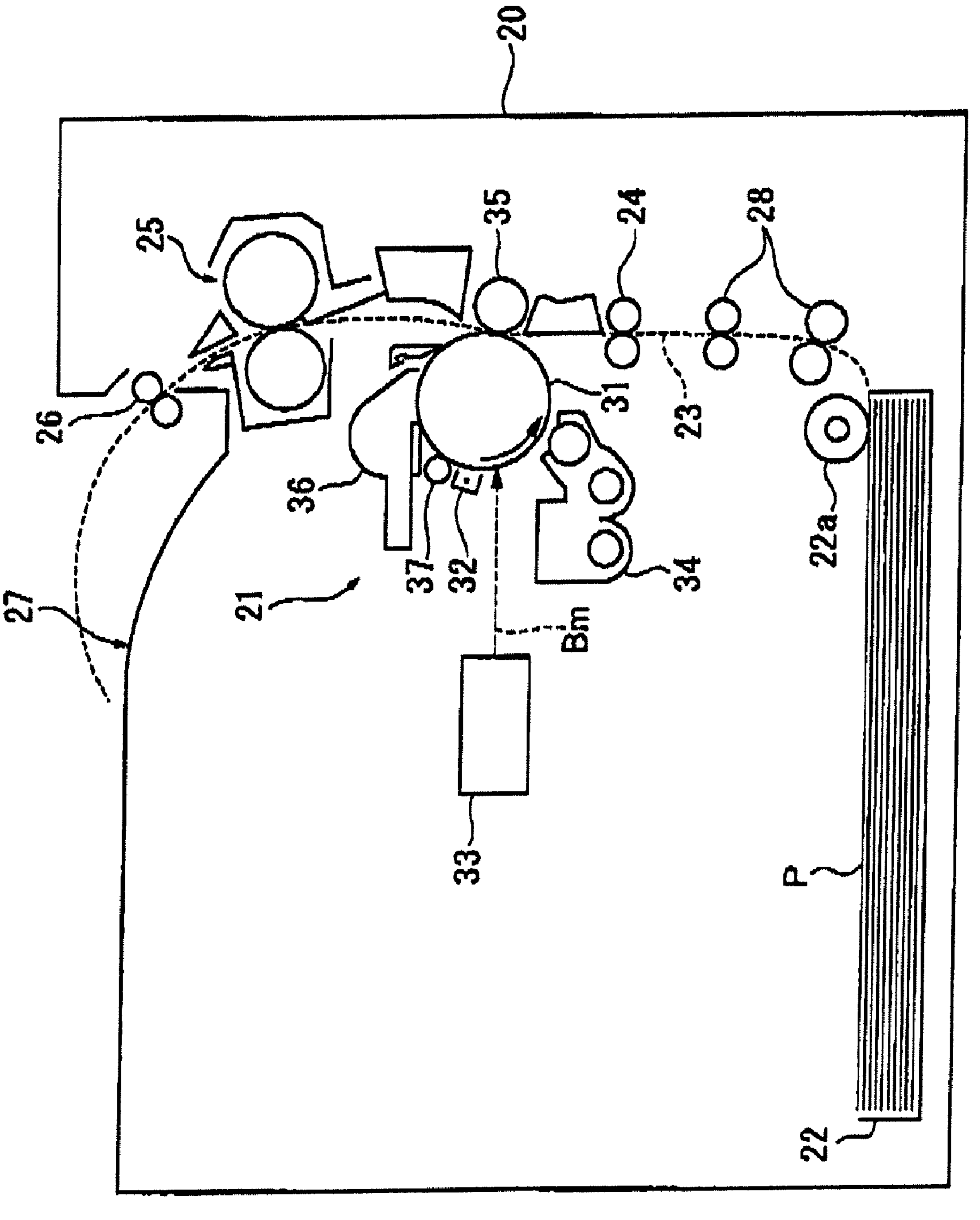
FIG. 3 is a diagram showing the whole configuration of an image forming apparatus which is used in Exemplary embodiment 1.

FIG. 3 is a diagram schematically showing Embodiment 1 of an image forming apparatus to which the invention is applied.

Referring to the figure, in the image forming apparatus, an image forming engine 21 of the electrophotographic system or the like is mounted in an apparatus casing 20, and a sheet feeding cassette 22 which can feed a sheet that is a recording member is disposed below the image forming engine 21 in the apparatus casing 20. A sheet discharge tray 27 which can accommodate the sheet P that has undergone a recording operation is in a top portion of the apparatus casing 20. A sheet conveying path 23 which guides the sheet P fed from the sheet feeding cassette 22 to the image forming engine 21 and the sheet discharge tray 27 is disposed in a substantially vertical direction on the side of a side face of the apparatus casing 20 (in the right side of FIG. 3).

In the exemplary embodiment, the image forming engine 21 includes: a photosensitive member 31 which can hold a toner image, and which has a drum-like shape or the like; a charging device 32 which charges the photosensitive member 31, and which is configured by a corona charger; an exposing device 33 which writes an electrostatic latent image onto the charged photosensitive member 31, and which is configured by a laser scanning device or the like; a developing device 34 which makes the electrostatic latent image on the photosensitive member 31 to a visible image by a toner; a transferring device 35 which transfers the toner image on the photosensitive member 31 to the sheet P, and which uses a transferring roll or the like; a cleaning device 36 which removes foreign substances remaining on the photosensitive member 31; and a lubricant applying device 37 which is disposed between a charging portion of the charging device 32 and a portion where the electrostatic latent image is written by the exposing device 33, and which applies a lubricant to the surface of the photosensitive member 31.

A feeding roll 22*a* which feeds the sheet P one by one is disposed in the sheet feeding cassette 22. Positioning rolls 24 which once position the sheet P, and which then convey the sheet are disposed in the sheet conveying path 23 and upstream from the photosensitive member 31. A fixing device 25 is disposed in the sheet conveying path 23 and downstream from the photosensitive member 31. Discharging rolls 26 are disposed immediately before the sheet discharge tray 27. In FIG. 3, the reference numeral 28 denotes conveying rolls which are disposed in an appropriate number in the sheet conveying path 23.

Figure 4:
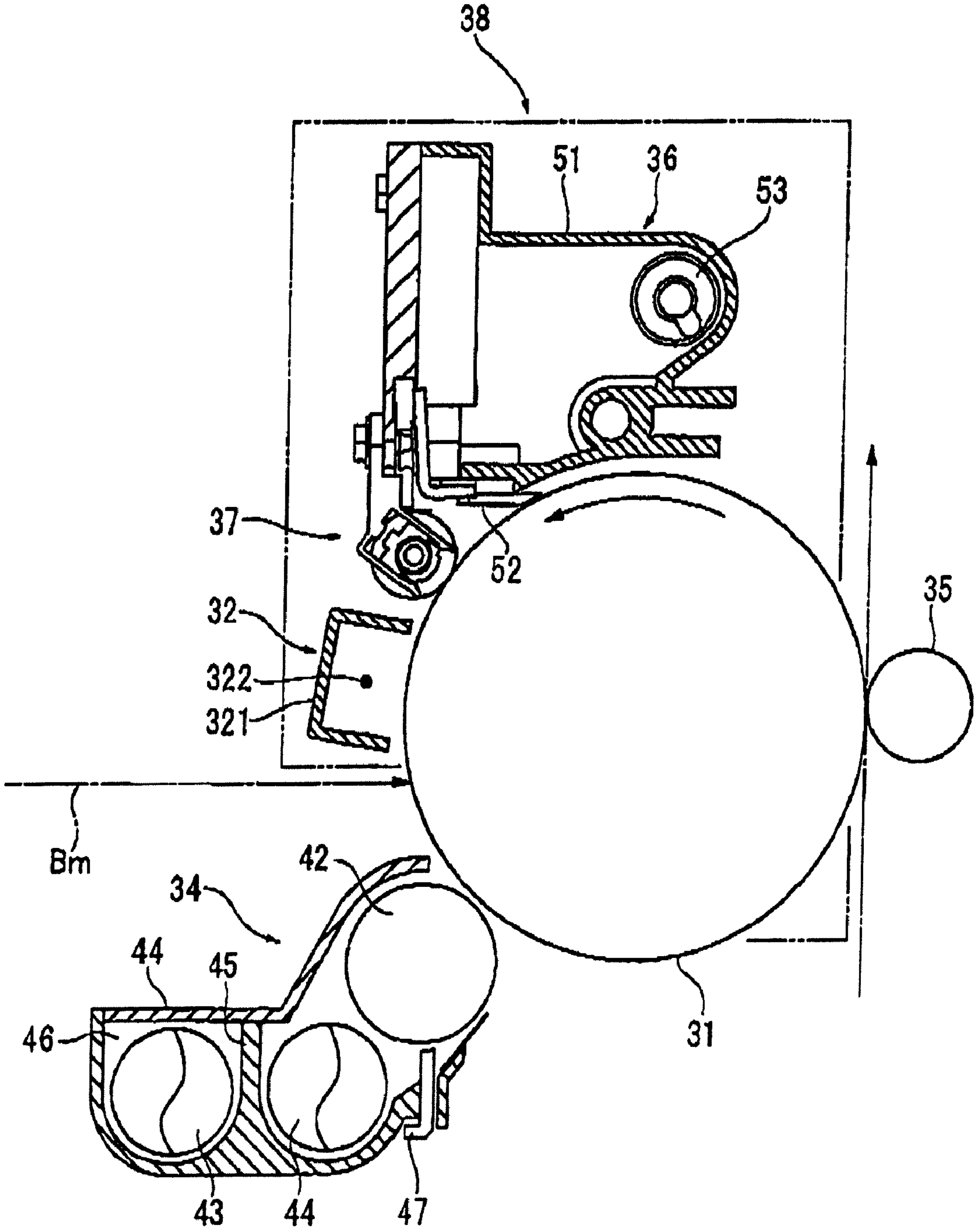
FIG. 4 is a diagram showing the configuration of the periphery of an image forming portion which is used in Exemplary embodiment 1.

In the image forming engine 21 of the exemplary embodiment, particularly, the photosensitive member 31, the charging device 32, the cleaning device 36, and the lubricant applying device 37 are integrated as an image forming assembly 38 (corresponding to a process cartridge) as shown in FIG. 4, and the image forming assembly, the developing device 34, and the exposing device 33 are separately disposed.

In the charging device 32, a discharge wire 322 is disposed in an insulative charging vessel 321, and a charging current is supplied to the discharge wire 322, thereby charging the surface of the photosensitive member 31.

The developing device 34 is disposed below an exposure beam Bm emitted from the exposing device 33, and has a developer container 41 which accommodates a two-component developer containing a toner and a carrier, and in which a portion on the side of the photosensitive member 31 is opened. A developing roll 42 is rotatably disposed in a portion facing the opening of the developer container 41. A pair of stirring and conveying members 43, 44 are disposed in the developer container 41 along the axial direction of the developing roll 42, and a partitioning plate 45 is disposed between the pair of stirring and conveying members 43, 44. Through holes which are not shown are disposed in the vicinities of the both longitudinal ends of the partitioning plate 45, respectively, to constitute a developer circulating path 46 through which the developer can be circularly conveyed. The reference numeral 47 denotes a layer restricting member which restricts a developer layer on the developing roll 42.

The cleaning device 36 has a cleaning container 51 which is opened in the side of the photosensitive member 31, and which houses foreign substances remaining on the photosensitive member 31. A plate-like cleaning member 52 which elongates in a direction perpendicular to the rotational direction of the photosensitive member 31, and which is placed in contact with the photosensitive member 31 is disposed in the opening edge of the cleaning container 51. A waste conveying member along which foreign substances scraped off by the cleaning member 52 are guided to a waste container (not shown) that is on the side of one end of the cleaning container 51 is disposed in the cleaning container 51.

—Lubricant Applying Device—

Figure 5A:
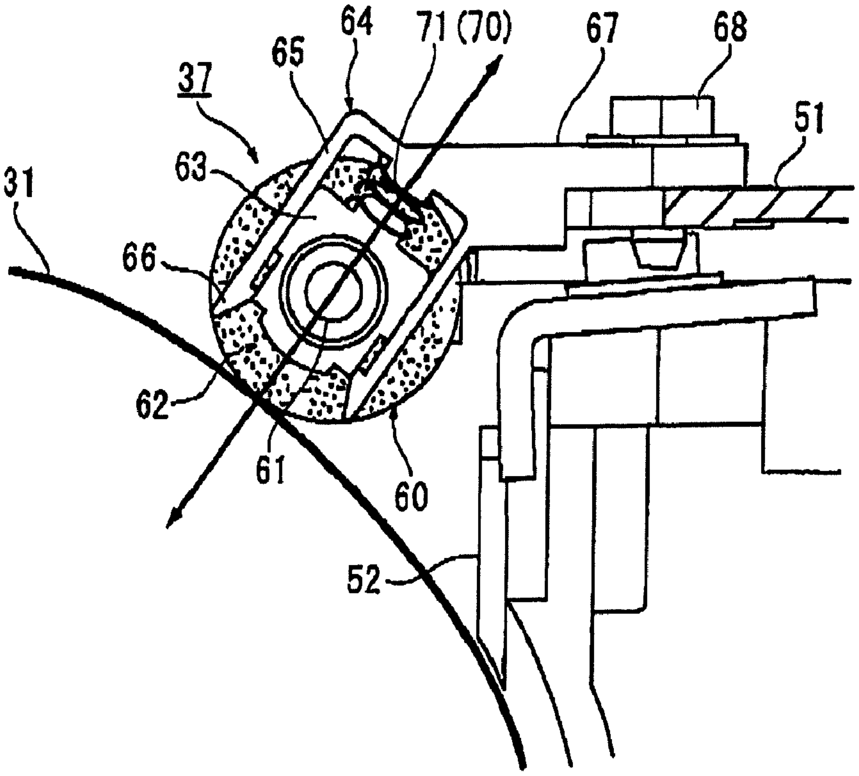
FIG. 5A is a diagram showing in detail the lubricant applying device shown in FIG. 4.
Figure 5B:
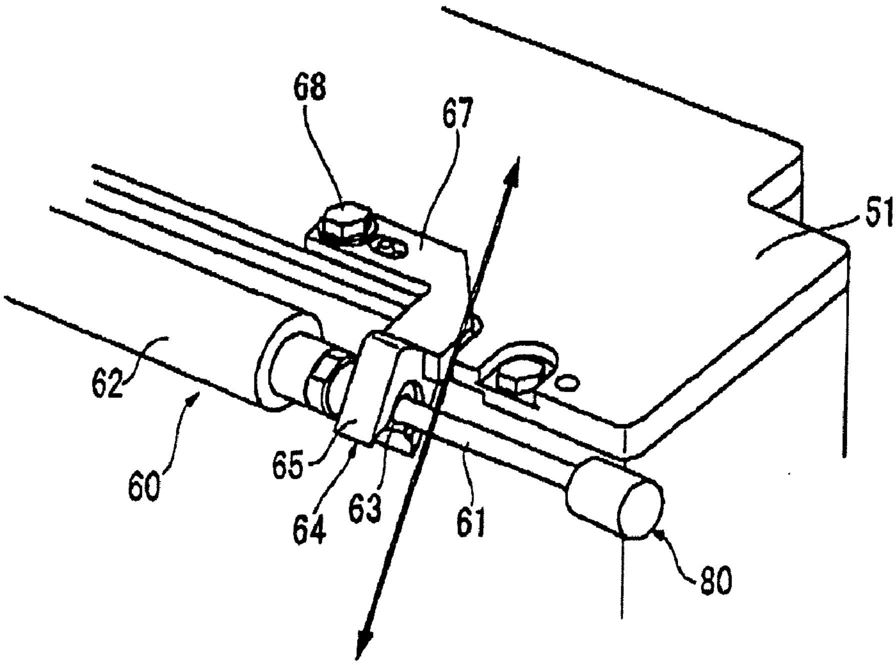
FIG. 5B is a perspective view of main portions.

In the exemplary embodiment, as shown in FIGS. 4, 5A, and 5B, the lubricant applying device 37 has a lubricating roll 60 in which the solid lubricant 62 is formed into a roll-like shape around a rotatable support shaft 61.

As the solid lubricant 62, ZnSt (zinc stearate) is used. In the lubricating roll 60, the support shaft 61 is rotatably supported by end bearings 63, and the end bearings 63 are held by guide holders 64 so as to be reciprocable in a radial direction of the photosensitive member 31.

Each of the guide holders 64 has a substantially inverted U-shaped guide piece 65 which is opened while being opposed to the photosensitive member 31. The end bearings 63 are embracingly held by the guide pieces 65. Hook-like pawl portions 66 which can block the end bearings 63 are formed at the tip ends of the inverted U-shaped guide pieces 65. In each of the guide holders 64, a mounting piece 67 which extends from the guide piece 65 is integrally formed, and the mounting piece 67 is fixed through a fixing piece 68 such as a screw to, for example, a part of the cleaning container 51 of the cleaning device 36.

The lubricating roll 60 is pressed toward the surface of the photosensitive member 31 by pressing mechanisms 70.

In the exemplary embodiment, each of the pressing mechanisms 70 is realized by a combination of the own weight of the lubricating roll 60, and a pressing spring 71 which is interposed between the substantially inverted U-shaped guide piece 65 of the guide holder 64 and the support shaft 61.

In the exemplary embodiment, as shown particularly in FIG. 5B, a torque limiter 80 serving as a rotation control mechanism is disposed in one end of the support shaft 61 of the lubricating roll 60.

—Torque Limiter—

Figure 6B:
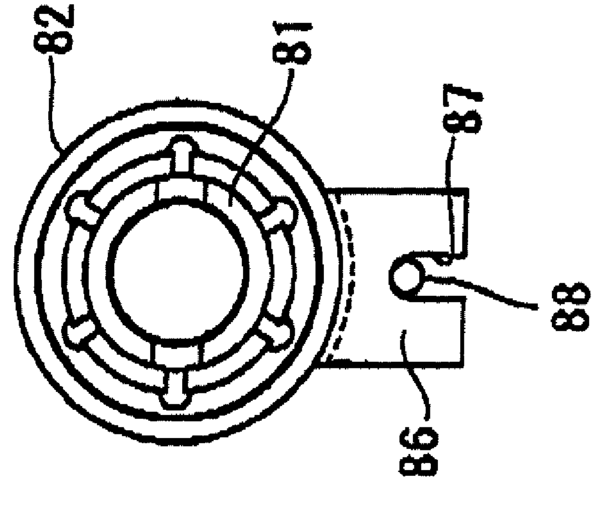
FIG. 6B is a view looking in the direction of the arrow B in FIG. 6A.
Figure 6A:
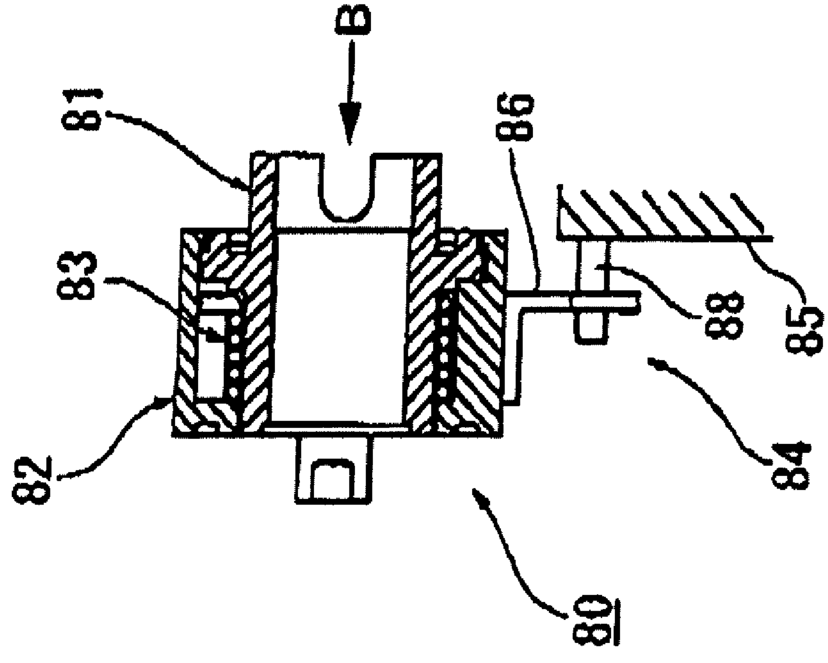
FIG. 6A is a diagram showing an example of a torque limiter which is used in the exemplary embodiment.

In the exemplary embodiment, as shown in, for example, FIGS. 6A and 6B, the torque limiter 80 includes: an inner ring 81 which is coaxially fitted and attached to the support shaft 61 of the lubricating roll 60; an outer ring 82 which is disposed so as to cover the periphery of the inner ring 81; and a coil spring 83 which is pressingly inserted and wound between the inner ring 81 and the outer ring 82. For example, the outer ring 82 is fixedly supported by a fixing member 85 through a rotation locking mechanism 84, and the rotating operation of the inner ring 81 is suppressed by a pressing force which is applied to the inner ring 81 by the coil spring 83.

In the rotation locking mechanism 84, for example, a locking member 86 in which a restraining groove 87 having a substantially U-like shape is formed is attached to a part of the outer ring 82, an engaging pin 88 is projected from the fixing member 85, and the engaging pin 88 is engaged with the restraining groove 87, whereby rotation of the outer ring 82 is locked.

In the exemplary embodiment, when a rotational torque which is equal to or higher than a predetermined level acts on the lubricating roll 60, therefore, a slipping rotational force which exceeds the suppressing force that is applied on the inner ring 81 by the coil spring 83 is applied on the inner ring 81 by the torque limiter 80, thereby causing the inner ring 81 to be relatively rotated with respect to the outer ring 82.

The torque limiter 80 is not restricted to the above-described mode, and may employ any one of various known structures.

<Torque Characteristics of Torque Limiter>

Figure 7:
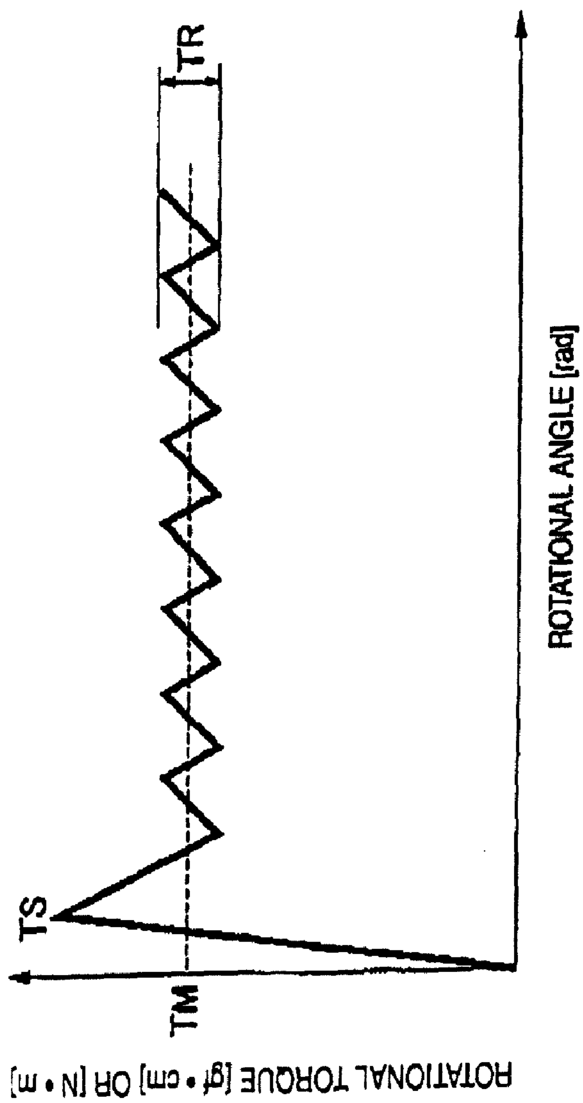
FIG. 7 is a view showing an example of a characteristic model diagram of the torque limiter which is used in Exemplary embodiment 1.

FIG. 7 shows the torque characteristics of the torque limiter 80 in the exemplary embodiment.

In the figure, TS means a torque value (static friction torque value/static torque value) at an instant when the torque limiter 80 slips, TM means a torque value (dynamic friction torque value/dynamic torque value) during a period when the torque limiter 80 slips, and TR means a variation amount of a dynamic torque (torque ripple value/torque unevenness) during the period when the torque limiter 80 slips.

Namely, the torque limiter 80 operates so that, in the case where a rotational toque which is equal to or higher than the predetermined rotational torque is applied on the lubricating roll 60, under conditions where the rotational toque exceeds the static torque value TS, the lubricating roll 60 is rotated in accordance with rotation of the photosensitive member 31, and, under conditions where the rotational toque is lower that the static torque value TS, rotation of the lubricating roll 60 is restrained. When the rotational toque acting on the lubricating roll 60 becomes lower than the dynamic torque value TM after the lubricating roll 60 is rotated in accordance with rotation of the photosensitive member 31, any portion of the surface of the lubricating roll 60 butts against the photosensitive member 31 to be restrained.

<Temporal Change of Lubricating Roll>

The lubricating roll 60 is pressed against the photosensitive member 31 by the predetermined pressing force, and hence the roll is gradually shaved and applied to the photosensitive member 31.

Figure 8:
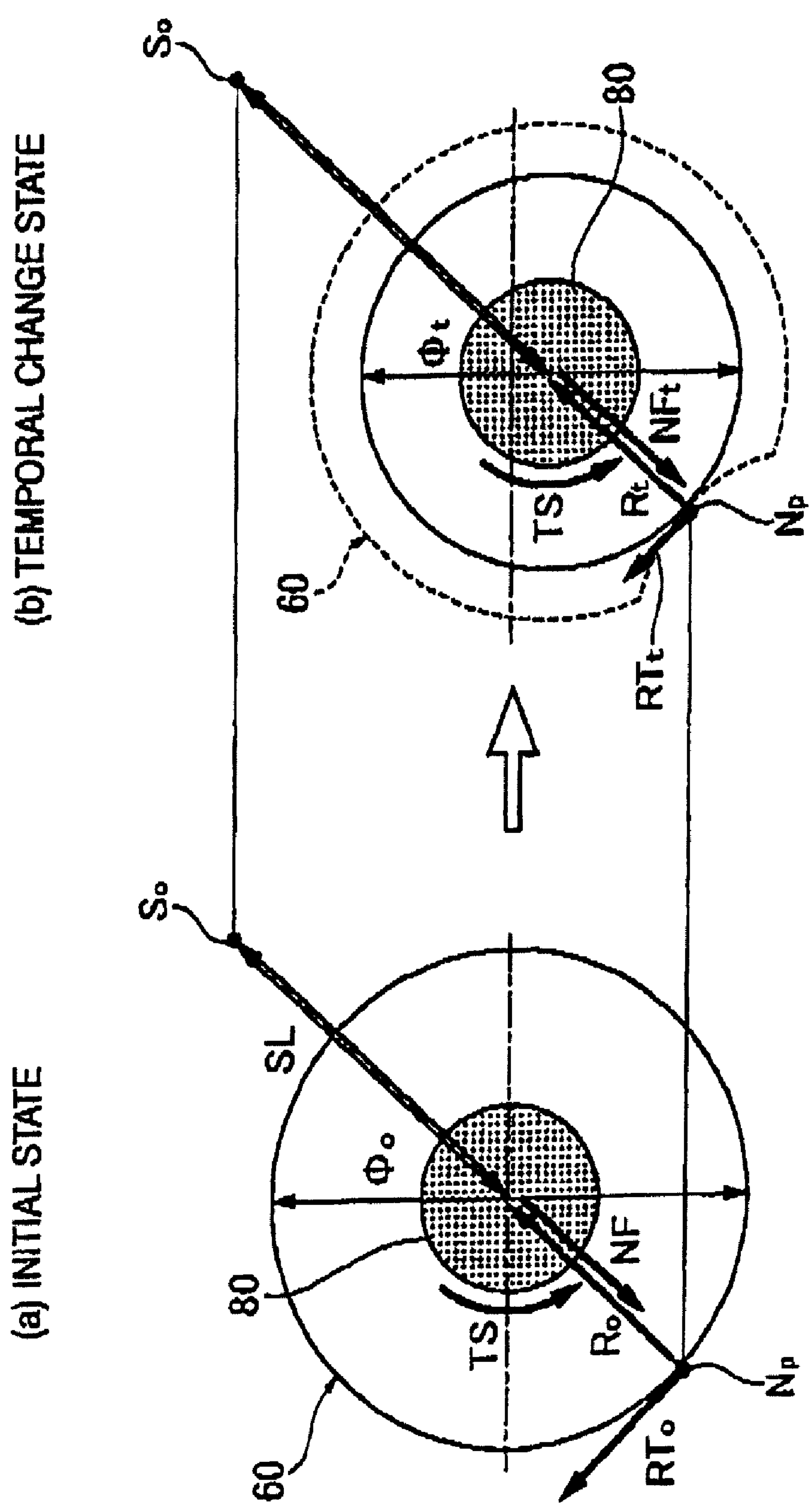
FIG. 8 is a diagram showing an initial state of the lubricant applying device, and a temporal change state of the lubricant applying device.

The initial state of the lubricating roll 60 is shown in (a) of FIG. 8.

In the figure, the outer diameter of the lubricating roll 60 has an initial value $\Phi_0$, and hence the radius $R_0$ is a half of the value. The length SL of the pressing spring 71 from the positioning position $S_0$ maintains its initial value. Therefore, the resultant force NF of the initial load of the pressing spring 71 and the own weight of the lubricating roll 60 is applied to the contact portion $N_P$ between the lubricating roll 60 and the photosensitive member 31. The rotational torque $RT_0$ acting on the lubricating roll 60 is indicated by the following expression:

$$RT_0=\mu\times NF\times R_0$$

where μ is the coefficient of friction between the lubricating roll 60 and the photosensitive member 31.

By contrast, when the lubricating roll 60 is temporally changed, the state shown in (b) of FIG. 8 is obtained.

When the lubricating roll 60 is shaved and applied to the photosensitive member 31, namely, the radius $R_t$ of the lubricating roll 60 is reduced in accordance with the temporal change of the lubricating roll 60, and the resultant force $NF_t$ of the temporally changing load of the pressing spring 71 and the own weight of the lubricating roll 60 is reduced by a degree corresponding to the elongation of the pressing spring 71. When the radius $R_t$ of the lubricating roll 60 is reduced by 1.4 mm, for example, the pressing spring 71 is elongated by 1.4 mm. In the case where the spring constant is 100 gf/mm, for example, the resultant force $NF_t$ is reduced by 140 gf. Therefore, the rotational torque $RT_t$ acting on the lubricating roll 60 is indicated by the following expression:

$$RT_t=\mu\times NF_t\times R_t$$

In this case, $NT_t<NT_0$ and $R_t<R_0$.

From the above, it will be understood that, when the rotational torque of the lubricating roll 60 is reduced by the temporal change, the lubricating roll 60 itself is hardly rotated. In view of this, therefore, the restraining torque (static torque value) TS of the torque limiter 80 must be set.

<Method of Setting Restraining Torque of Torque Limiter>

Figure 9:
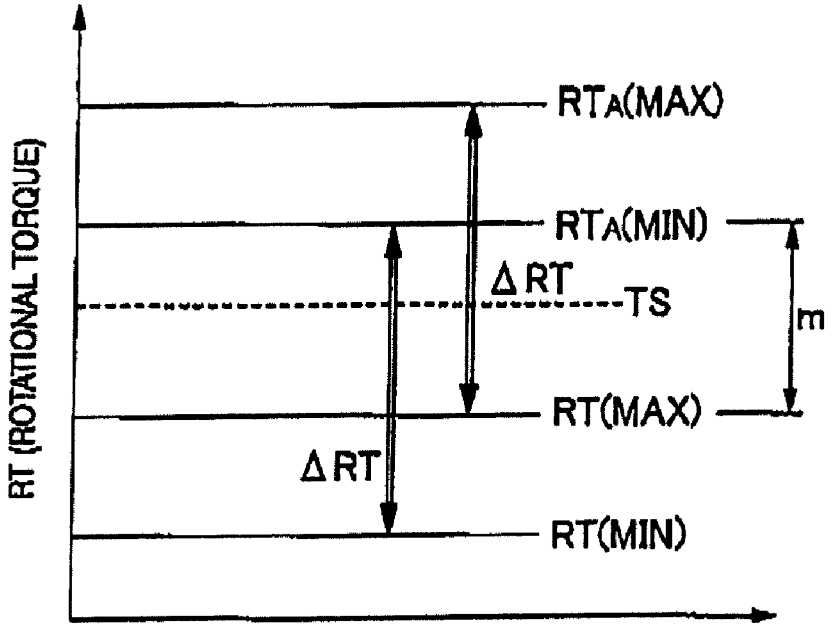
FIG. 9 is a diagram showing a technique of setting the restraining torque of the torque limiter which is used in Exemplary embodiment 1.

Next, a method of setting the restraining torque (static torque value) TS of the torque limiter 80 will be described with reference to FIG. 9.

In the figure, when the rotational torque in the initial state of the lubricating roll 60 is indicated by RT(MAX), the rotational torque at the end of life of the lubricating roll 60 (corresponding to the time when the solid lubricant of the lubricating roll 60 is consumed up and the support shaft 61 is exposed) is indicated by RT(MIN), the increment of the rotational torque caused by incorporation of the toner, paper dust, or the carrier that is a foreign substance into the contact portion between the lubricating roll 60 and the photosensitive member 31 is indicated by ΔRT, "RT(MAX)+ΔRT" is indicated by "$RT_A$(MAX)", and "RT(MIN)+ΔRT" is indicated by "$RT_A$(MIN)", the restraining torque (static torque value) TS of the torque limiter 80 is selected so as to enter the region m excluding boundaries with respect to $RT_4$(MIN) and RT(MAX).

—Operation Process of Lubricant Applying Device—

It is assumed that the restraining torque TS of the torque limiter 80 is selected as described above.

Figure 10B:
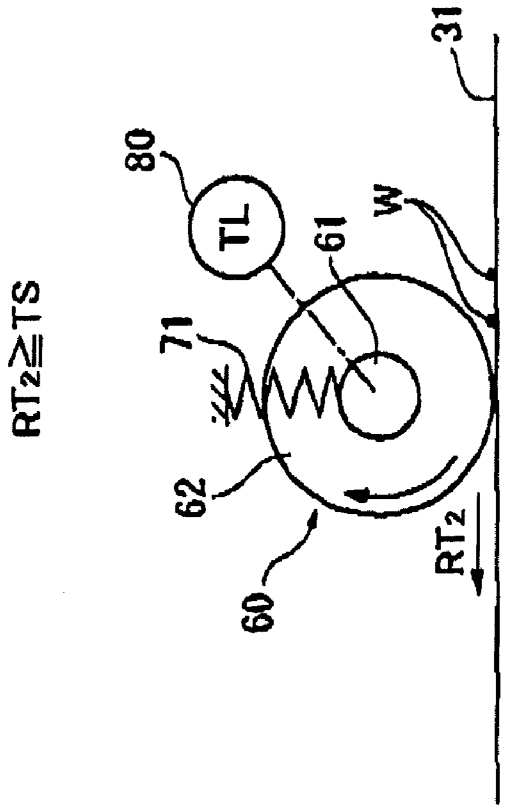
FIG. 10B is a diagram showing an operation example of the lubricant applying device which is used in Exemplary embodiment 1, in the case where the rotational torque acting on the lubricating roll is equal to or higher than the restraining torque of the torque limiter.
Figure 10A:
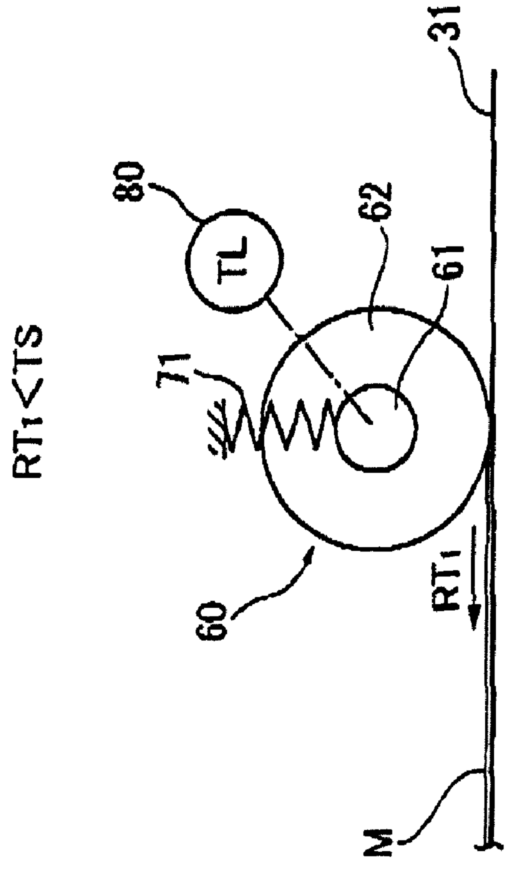
FIG. 10A is a diagram showing an operation example of the lubricant applying device which is used in Exemplary embodiment 1, in the case where the rotational torque acting on the lubricating roll is lower than the restraining torque of the torque limiter.

First, as shown in FIG. 10A, in the case where the rotational torque $RT_1$ acting on the lubricating roll 60 is lower than the restraining torque TS of the torque limiter 80, the lubricating roll 60 is contacted with the photosensitive member 31 while maintaining the resting state, and hence the solid lubricant is shaved off from the lubricating roll 60, and a lubricant layer M formed by the solid lubricant is formed on the surface of the photosensitive member 31.

As shown in FIG. 10B, in the case where a foreign substance W such as the toner, paper dust, or the carrier adheres to the photosensitive member 31 and the foreign substance W enters the contact portion between the lubricating roll 60 and the photosensitive member 31, the coefficient of friction between the lubricating roll 60 and the photosensitive member 31 is increased by the existence of the foreign substance W. The rotational torque $RT_2$ acting on the lubricating roll 60 correspondingly becomes higher than the restraining torque TS caused by the torque limiter 80. Then, the lubricating roll 60 which has been in the resting state is rotated in accordance with rotation of the photosensitive member 31, and the foreign substance W which has been incorporated into the contact portion between the lubricating roll 60 and the photosensitive member 31 is passed through the contact portion to be discharged therefrom.

After the operation of discharging the foreign substance W, the foreign substance W does not exist in the contact portion between the lubricating roll 60 and the photosensitive member 31, and hence the friction coefficient $\mu$ therebetween is reduced, the rotational torque $RT_2$ acting on the lubricating roll 60 correspondingly becomes lower than the dynamic torque value TM shown in FIG. 7, and the lubricating roll 60 is again restrained at any portion of the surface to enter the resting state.

—Function of Transferring Device in Transferring Portion—

Figure 11B:
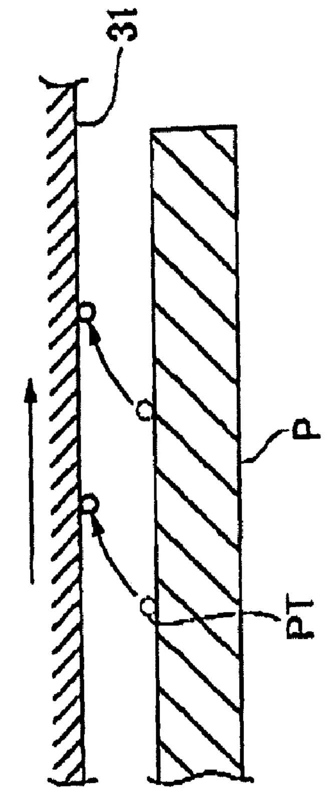
FIG. 11B is a diagram showing an operation in the transferring portion in the case where the lubricant layer is not formed by the lubricant applying device.
Figure 11A:
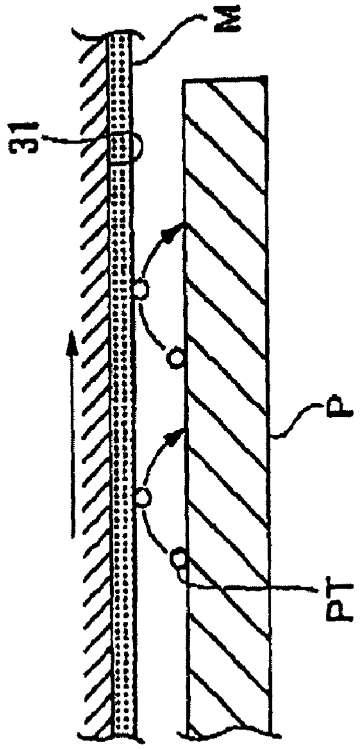
FIG. 11A is a diagram showing an operation in a transferring portion caused by a lubricant layer formed by the lubricant applying device which is used in Exemplary embodiment 1.

It is assumed that, as shown in FIG. 11A, the lubricant layer M is formed on the surface of the photosensitive member 31 by the lubricating roll 60, and the lubricant layer M reaches the transferring portion of the transferring device 35.

When, in this state, the sheet P that is a recording member enters the transferring portion of the transferring device 35, the talc component PT of the sheet P is contacted with the surface of the photosensitive member 31.

However, the surface of the photosensitive member 31 is covered by the lubricant layer M, and therefore the talc component PT of the sheet P does not adhere to the surface of the photosensitive member 31, and returns to the sheet P. Consequently, the situation where the talc component PT of the sheet P adheres to the surface of the photosensitive member 31 hardly occurs.

In a comparative mode in which the lubricant layer M is not formed on the surface of the photosensitive member 31 as shown in FIG. 11B, when the sheet P enters the transferring portion of the transferring device 35, the talc component PT of the sheet P easily adheres to the surface of the photosensitive member 31, and the talc component PT of the sheet P correspondingly remains on the surface of the photosensitive member 31. In this case, since a toner image is hardly formed in a place where the talc component PT exists, there arises a fear that a toner image on the photosensitive member 31 is easily disturbed.

Modifications

Figure 12:
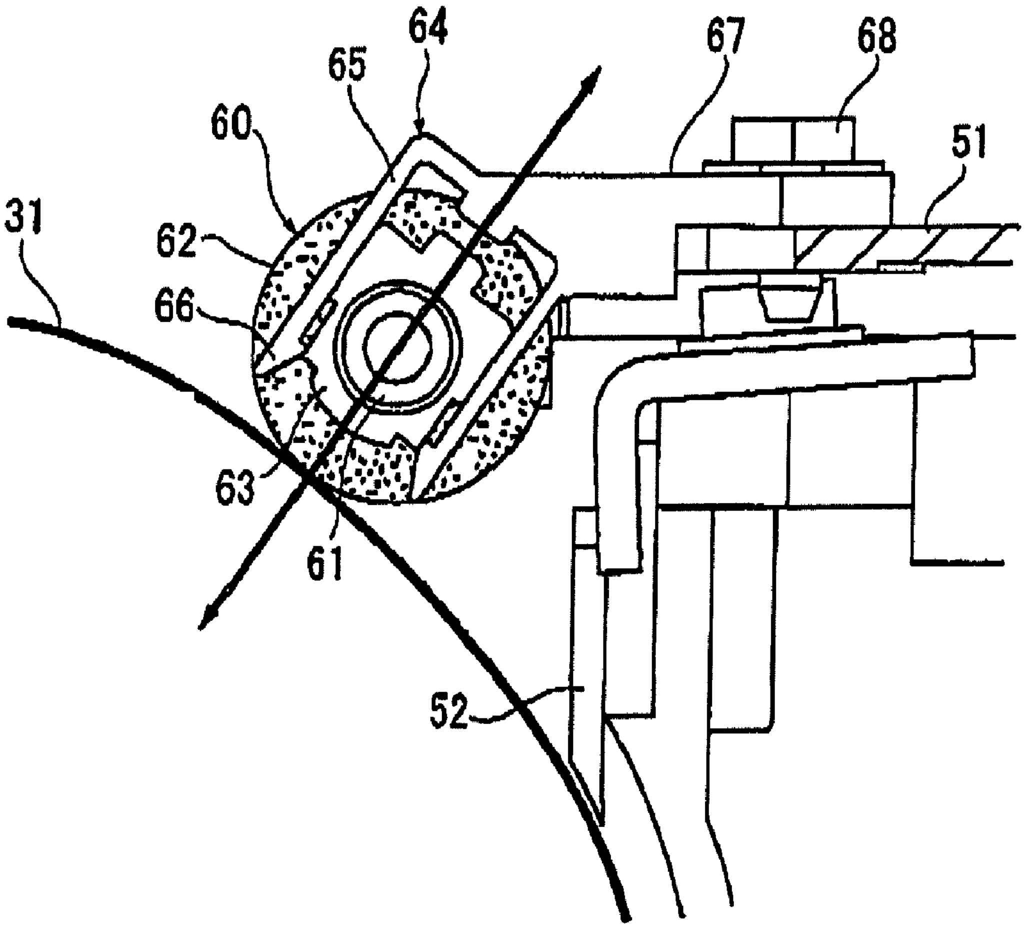
FIG. 12 is a diagram showing a modification of the lubricant applying device which is used in Exemplary embodiment 1.

In the exemplary embodiment, the combination of the own weight of the lubricating roll 60 and the pressing force of the pressing spring 71 is used in the pressing mechanisms 70. However, the invention is not restricted to this. In the case where a layout in which the lubricating roll 60 is placed above the photosensitive member 31 is employed as shown in FIG. 12, for example, only the own weight of the lubricating roll 60 may be used.

In a layout in which the own weight of the lubricating roll 60 does not act, only the pressing force of the pressing spring 71 may be used.

Exemplary Embodiment 2

Figure 13A:
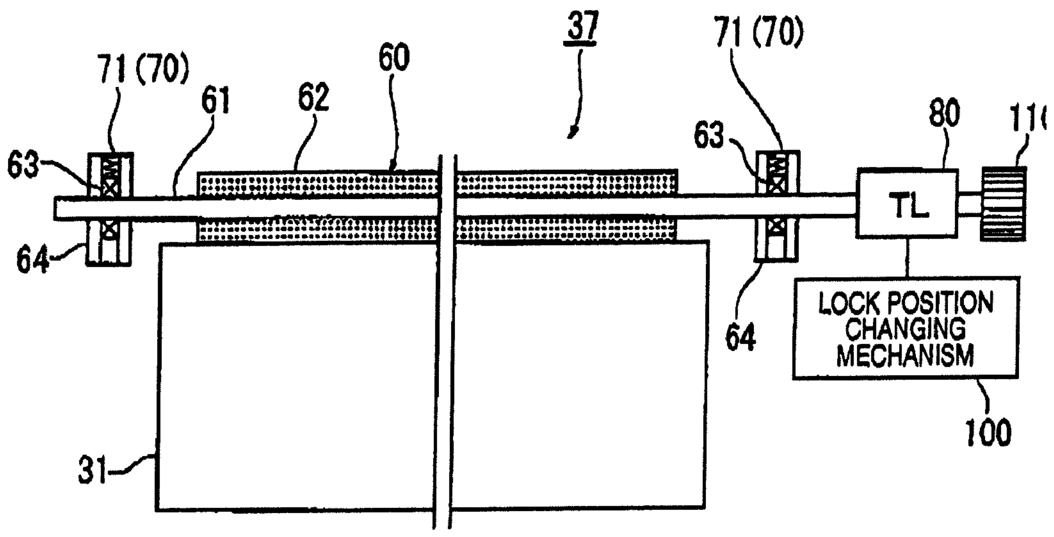
FIG. 13A is a diagram schematically showing a lubricant applying device which is used in an image forming apparatus of Exemplary embodiment 2.

FIG. 13A is a diagram showing Exemplary embodiment 2 of a lubricant applying device used in an image forming apparatus to which the invention is applied.

Referring to the figure, in a substantially same manner as Embodiment 1, the lubricant applying device 37 includes: the lubricating roll 60 which is contacted with the photosensitive member 31; the pressing mechanisms 70 which press the lubricating roll 60 toward the photosensitive member 31; and the torque limiter 80 serving as a rotation control mechanism which restrains rotation of the lubricating roll 60. To the torque limiter 80, a lock position changing mechanism 100 which changes the rotational position of the lubricating roll 60, and an operation knob 110 which rotationally operates the torque limiter 80 are added.

Figure 13B:
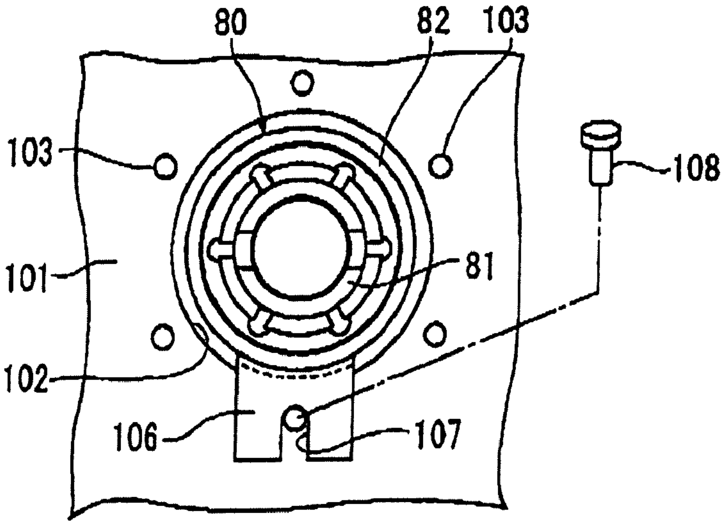
FIG. 13B is a diagram showing an example of a lock position changing mechanism.

As shown in FIG. 13B, foe example, the lock position changing mechanism 100 is configured so that a circular through hole 102 through which the torque limiter 80 is passed is disposed in a fixing member 101, lock holes 103 are disposed at predetermined angular intervals in the periphery of the through hole 102 of the fixing member 101, a locking member 106 in which a restraining groove 107 having a substantially U-like shape is formed is attached to a part of the outer ring 82 of the torque limiter 80, and the locking member 106 is adequately rotated, whereby a detachable lock pin 108 is engaged with the restraining groove 107 of the locking member 106, and positionally inserted into one of the lock holes 103 of the fixing member 101.

Figure 14:
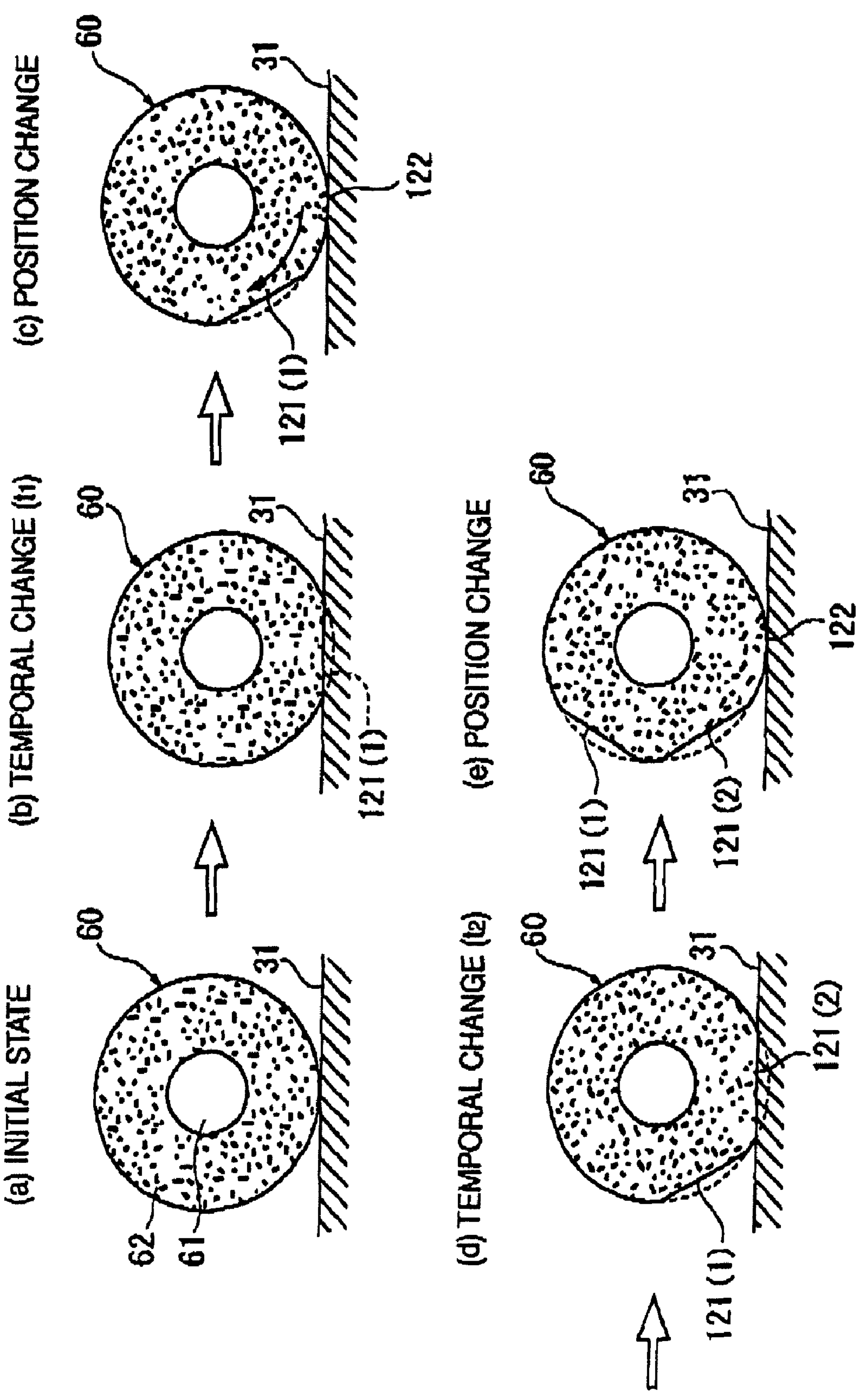
FIG. 14 is a diagram showing an operation process of the lubricant applying device which is used in Exemplary embodiment 2.

In the exemplary embodiment, the lubricating roll 60 is temporally changed ($t_1$) from the initial state (see (a) of FIG. 14). When it is assumed that, as shown in (b) of FIG. 14, the lubricating roll 60 does not perform the rotating operation and remains to be placed at a predetermined position in the resting state for a long term, the contact portion of the lubricating roll 60 with respect to the photosensitive member 31 is shaved gradually and locally.

When this state is left as it is until the contact portion of the lubricating roll 60 with respect to the photosensitive member 31 is locally shaved to reach the support shaft 61, the lubricating roll 60 finishes its life in the state where the roll is locally shaved. In the exemplary embodiment, as shown in (c) of FIG. 14, for example, the lock pin 108 of the look position changing mechanism 100 is pulled out, the operation knob 110 which is disposed coaxially with the outer ring 82 of the torque limiter 80 is rotated by a predetermined angle, the lock pin 108 of the lock position changing mechanism 100 is again engaged with the restraining groove 107 of the locking member 106, and the lock pin 108 is positionally inserted into, for example, the lock hole 103 which is adjacent to the original lock hole, whereby the rotational position of the lubricating roll 60 is forcedly rotated by the predetermined angle to cause the new face 122 to be contacted with the photosensitive member 31, in place of the shaved face 121(1) of the lubricating roll 60.

When, in this state, the lubricating roll 60 is temporally changed ($t_2$) as shown in (d) of FIG. 14 and left at the predetermined position in the resting state for a long term while the roll does not perform the rotating operation, the contact portion of the lubricating roll 60 with respect to the photosensitive member 31 is gradually shaved. In this state, when the rotational position of the lubricating roll 60 is again changed by using the lock position changing mechanism 100, the new face 122 is contacted with the photosensitive member 31, in place of the shaved faces 121(1), 121(2) of the lubricating roll 60 as shown in (e) of FIG. 14. Thereafter, in the case where the lubricating roll 60 is locally shaved by the temporal change, the rotational position of the lubricating roll 60 is adequately rotated by using the lock position changing mechanism 100.

In the exemplary embodiment, the operation knob 110 is disposed separately from the torque limiter 80. It is a matter of course that, for example, the outer ring 82 of the torque limiter 80 may function also as the operation knob 110.

Exemplary Embodiment 3

Figure 15:
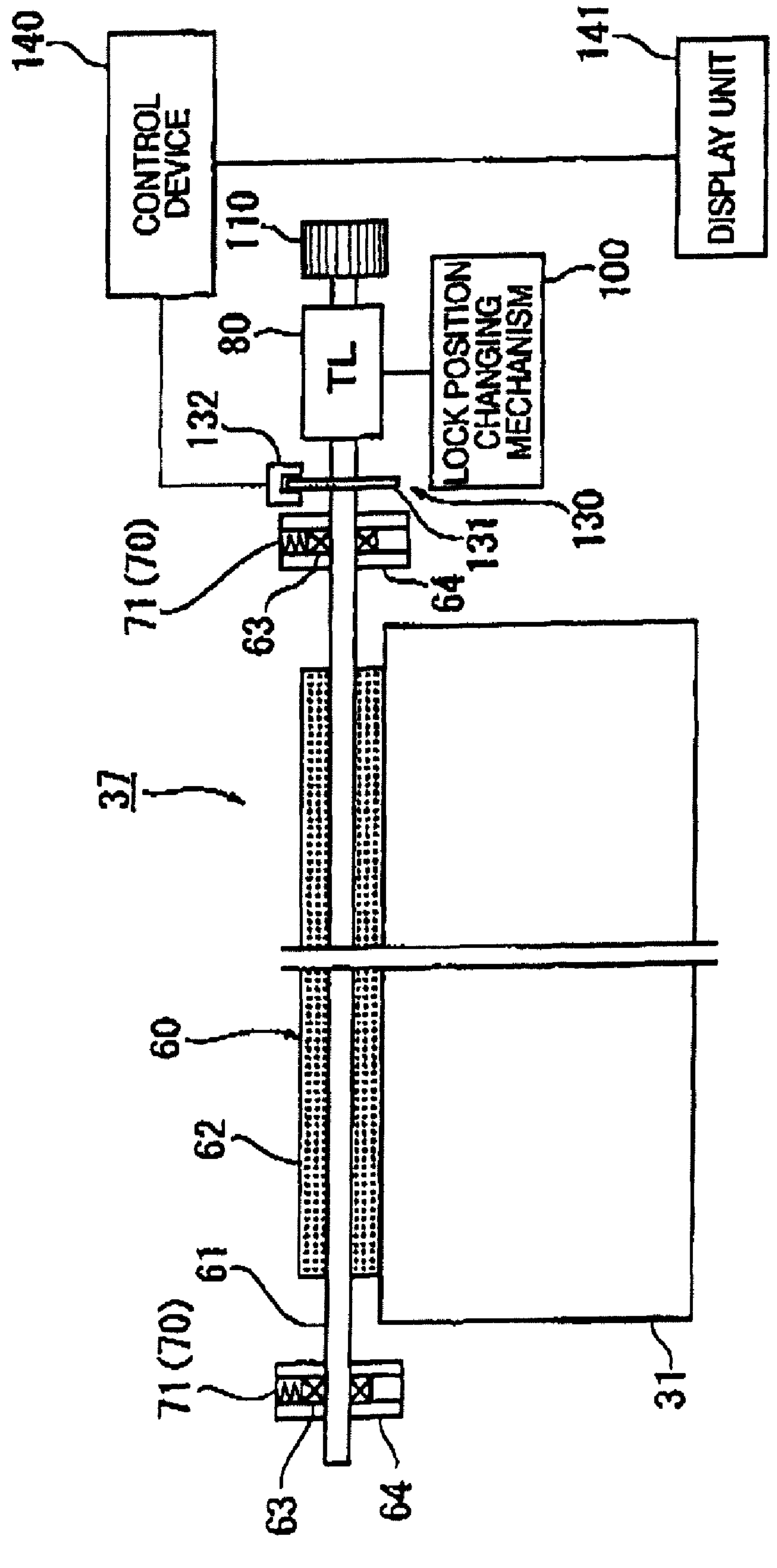
FIG. 15 is a diagram schematically showing a lubricant applying device which is used in an image forming apparatus of Exemplary embodiment 3.

FIG. 15 is a diagram showing Exemplary embodiment 3 of a lubricant applying device used in an image forming apparatus to which the invention is applied.

Referring to the figure, the lubricant applying device 37 is approximately identical in basic configuration with Exemplary embodiment 2, but, unlike Exemplary embodiment 2, a position detector 130 is disposed in the periphery of the support shaft 61 of the lubricating roll 60 in order to detect whether the lubricating roll 60 is rotated or not. The components similar to those of Exemplary embodiment 2 are denoted by the same reference numerals as Exemplary embodiment 2, and their description is omitted.

In the exemplary embodiment, the position detector 130 has: a slitted disc 131 which is disposed on, for example, the support shaft 61 of the lubricating roll 60; and an optical sensor 132 in which a light emitting portion and a light receiving portion are opposed to each other across the slit of the slitted disc, and which detects whether the slit passes over the portion or not.

Detection information of the optical sensor 132 is supplied to a control device 140. If the control device 140 determines that the lubricating roll 60 remains to be in the resting state for a predetermined long term, on the basis of, for example, the information from the optical sensor 132, an alarm indicative of the determination is displayed on a display unit 141.

Then, the user views the alarm display on the display unit 141, and can change the rotational position of the lubricating roll 60 by using the lock position changing mechanism 100.

In the exemplary embodiment, a manual operation is performed by using the lock position changing mechanism 100 to change the rotational position of the lubricating roll 60. The invention is not restricted to this. Alternatively, if the control device 140 determines that the lubricating roll 60 remains to be in the resting state for the predetermined long term, for example, a drive transmitting mechanism which is not shown is selectively coupled to the lubricating roll 60, and the lubricating roll 60 is caused to be automatically rotated through the drive transmitting mechanism, thereby changing the rotational position of the lubricating roll 60.

EXAMPLES

Example 1

In the example, the lubricant applying device 37 of the image forming apparatus of Exemplary embodiment 1 is used, and use conditions (initial state) for setting the lubricating roll 60 to the resting state are obtained.

The use conditions in this case are listed in FIG. 16.

As the lubricating roll 60, a roll in which a roll-like solid lubricant having an outer diameter of 14 mm is disposed around a support shaft that has a diameter of 6 mm in the initial state is used. As the pressing mechanisms 70 of the lubricating roll 60, mechanisms configured by the combination of the own weight of the lubricating roll 60 and the pressing force of the pressing spring 71 are used. The friction coefficient μ between the lubricating roll 60 and the photosensitive member 31 is measured by, for example, Pendulum II type (50° C.) test method.

In the example, the restraining torque (static torque value) TS of the torque limiter 80 is set to 90 gf·cm, and the rotational torque (gf·cm) is measured under conditions which are applied to the lubricating roll 60. The following results are obtained.

Normal state: 21

Abnormal state 1 (the toner is incorporated as a foreign substance): 82

Abnormal state 2 (paper dust is incorporated as a foreign substance): 103

Abnormal state 3 (the carrier is incorporated as a foreign substance): 185

In this case, it will be understood that, in Normal state and Abnormal state 1, the rotational torque RT is RT<TS, and hence the lubricating roll 60 maintains the resting state with respect to the photosensitive member 31, and, in Abnormal state 2 and Abnormal state 3, the rotational torque RT is RT≧TS, and hence the lubricating roll 60 is rotated in accordance with rotation of the photosensitive member 31.

In Abnormal state 1, the toner is incorporated as a foreign substance into the contact portion between the lubricating roll 60 and the photosensitive member 31. The coefficient of friction between the toner and the photosensitive member is lower as compared with paper dust or the carrier. Therefore, it is determined that, as an element which may damage the photosensitive member 31, the toner does not exert a large influence.

Example 2

The example shows an example of a method in which the lubricant applying device of the image forming apparatus which is similar to that of Example 1 is used, the rotational torques in the initial state (the radius: 0.7 cm) of the lubricating roll 60 and the temporal change state (the radius: 0.4 cm, 0.3 cm) are measured, and the restraining torque (static torque value) TS of the torque limiter 80 is set.

FIG. 17 shows results.

In FIG. 17, as the pressing mechanisms 70, mechanisms in which the own weight of the lubricating roll 60 and the pressing force (three kinds of 400 gf, 600 gf, and 800 gf) of the pressing spring 71 are combined with each other are used. The term "Total weight" means a total of the own weight of the lubricating roll 60 and the pressing force of the pressing spring 71.

In the figure, the state where the lubricating roll 60 has the radius of 0.3 cm (corresponding to the radius of the support shaft) means that the lubricating roll is at the end of life. The rotational torque in the case where the pressing force of the pressing spring is, for example, 400 gf is checked, and the following results are obtained.

Abnormal state 2: 77.4 gf·cm (195.2 gf·cm in the initial state)

Abnormal state 3: 139.4 gf·cm (351.4 gf·cm in the initial state)

In the initial state of the lubricating roll 60, the rotational torque in the normal state is 39.0 gf·cm.

In this case, the restraining torque (static torque value) TS of the torque limiter 80 may be adequately selected in a region between 39.0 gf·cm (the rotational torque in the normal state in the initial state) and 77.4 gf·cm (the rotational torque in Abnormal state 2 at the end of life) (excluding the boundary values). In the case where torque limiters respectively having three kinds of restraining torques of 40, 65, and 90 are prepared, for example, the torque limiters respectively having restraining torques of 40 and 65 may be selected from the three kinds of torque limiters.

The rotational torque in the case where the pressing force of the pressing spring is 600 gf is checked, and the following results are obtained.

Abnormal state 2: 107.4 gf·cm (265.2 gf·cm in the initial state)

Abnormal state 3: 193.4 gf·cm (477.4 gf·cm in the initial state)

In the initial state of the lubricating roll 60, the rotational torque in the normal state is 53.0 gf·cm.

In this case, the restraining torque (static torque value) TS of the torque limiter 80 may be adequately selected in a region between 53.0 gf·cm (the rotational torque in the normal state in the initial state) and 107.4 gf·cm (the rotational torque in Abnormal state 2 at the end of life) (excluding the boundary values). For example, torque limiters respectively having restraining torques of 65 and 90 may be selected.

Namely, "Rotational torque in normal state" is expressed by μ×NF×R where μ: the coefficient between the lubricating roll and the photosensitive member NF: Total weight R: the distance from the rotation center of the lubricating roll to the contact portion with respect to the photosensitive member.

The torques may be set so as to satisfy the relationships of "Rotational torque in normal state"<"Restraining torque of torque limiter"<"Rotational torques in Abnormal state 2 and Abnormal state 3".

Here, the degree at which, when a foreign substance in Abnormal state 2 or 3 is incorporated, "μ (coefficient of friction between the lubricating roll 60 and the photosensitive member 31)" is increased with respect to that in the normal state is important. In the example, "μ" in the normal state is 0.1, and "μ" in Abnormal state 2 and Abnormal state 3 are 0.5 and 0.9.

Based on the results of FIG. 17, the selection range of the restraining torque of the torque limiter 80 is approximately as follows:

Rotational torque in normal state: 40 to 70 (gf·cm)

Rotational torques in abnormal state (in this case, Abnormal state 2): 80 to 140 (gf·cm)

Restraining torque of torque limiter: 60 to 100 (gf·cm).

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention defined by the following claims and their equivalents.

What is claimed is:

1. A lubricant applying device that faces a rotatable body, and that applies a solid lubricant to the rotatable body, the device comprising:

a lubricating roll in which the solid lubricant for application is formed into a circular sectional shape around a rotatable support shaft, and that is contacted with the rotatable body; and a pressing mechanism that presses the lubricating roll toward the rotatable body, wherein the lubricating roll that is pressed against the rotatable body by the pressing mechanism applies the lubricant in a state where the lubricating roll is not rotated relative to the rotatable body, and, when a rotational torque due to the contact with the rotatable body exceeds a predetermined value, the lubricating roll is rotated in accordance with rotation of the rotatable body and when the rotational torque does not exceed the predetermined value, the lubricating roll is not rotated.

2. The lubricant applying device according to claim 1, wherein the pressing mechanism presses the lubricating roll by an own weight or a pressing spring.

3. A lubricant applying device that faces an image carrier that can hold a toner image, and that applies a solid lubricant to the image carrier, the device comprising:

a lubricating roll in which the solid lubricant for application is formed into a circular sectional shape around a rotatable support shaft, and that is contacted with the image carrier; and a pressing mechanism that presses the lubricating roll toward the image carrier, wherein the lubricating roll that is pressed against the image carrier by the pressing mechanism applies the lubricant in a state where the lubricating roll is not rotated relative to the image carrier, and, when a rotational torque due to the contact with the image carrier exceeds a predetermined value, the lubricating roll is rotated in accordance with rotation of the image carrier and when the rotational torque does not exceed the predetermined value, the lubricating roll is not rotated.

4. The lubricant applying device according to claim 3, wherein the pressing mechanism presses the lubricating roll by an own weight or a pressing spring.

5. The lubricant applying device according to claim 3, wherein the pressing mechanism suppresses a change of a pressing force irrespective of consumption of the solid lubricant of the lubricating roll.

6. The lubricant applying device according to claim 3, wherein the support shaft of the lubricating roll is movable along a pressing direction of the pressing mechanism.

7. The lubricant applying device according to claim 3, further comprising a position changing mechanism that makes a contact portion of the lubricating roll with the image carrier variable.

8. The lubricant applying device according to claim 7, further comprising a position detector that can detect a rotational position of the lubricating roll.

9. A lubricant applying device that faces an image carrier that can hold a toner image, and that applies a solid lubricant to the image carrier, the device comprising:

a lubricating roll in which the solid lubricant for application is formed into a circular sectional shape around a rotatable support shaft, and that is contacted with the image carrier;

a pressing mechanism that presses the lubricating roll toward the image carrier; and a rotation control mechanism that, when a rotational torque about the support shaft of the lubricating roll that is pressed against the image carrier by the pressing mechanism is lower than a predetermined rotational torque, restrains rotation of the lubricating roll, and, when the rotational torque is equal to or higher than the predetermined rotational torque, causes the lubricating roll to be rotated in accordance with rotation of the image carrier.

10. The lubricant applying device according to claim 9, wherein the rotation control mechanism is a torque limiter that is incorporated in the support shaft of the lubricating roll.

11. An image forming assembly comprising an image carrier that can hold a toner image, and a lubricant applying device that faces the image carrier and applies a solid lubricant to the image carrier, the assembly being to be detachably attached to a casing of an image forming apparatus, the lubricant applying device comprising:

a lubricating roll in which the solid lubricant for application is formed into a circular sectional shape around a rotatable support shaft, and that is contacted with the image carrier;

a pressing mechanism that presses the lubricating roll toward the image carrier; and a rotation control mechanism that, when a rotational torque about the support shaft of the lubricating roll that is pressed against the image carrier by the pressing mechanism is lower than a predetermined rotational torque, restrains rotation of the lubricating roll, and, when the rotational torque is equal to or higher than the predetermined rotational torque, causes the lubricating roll to be rotated in accordance with rotation of the image carrier.

12. An image forming apparatus comprising an image carrier that can hold a toner image, and a lubricant applying device that faces the image carrier, and that applies a solid lubricant to the image carrier, the lubricant applying device comprising:

a lubricating roll in which the solid lubricant for application is formed into a circular sectional shape around a rotatable support shaft, and that is contacted with the image carrier;

a pressing mechanism that presses the lubricating roll toward the image carrier; and a rotation control mechanism that, when a rotational torque about the support shaft of the lubricating roll that is pressed against the image carrier by the pressing mechanism is lower than a predetermined rotational torque, restrains rotation of the lubricating roll, and, when the rotational torque is equal to or higher than the predetermined rotational torque, causes the lubricating roll to be rotated in accordance with rotation of the image carrier.

13. The image forming apparatus according to claim 12, further comprising a cleaning device that has a cleaning member being in contact with the image carrier, the cleaning member cleaning the image carrier by scraping off a foreign substance remaining on the image carrier, wherein the lubricant applying device is disposed downstream from the cleaning member in a moving direction of the image carrier.

14. The image forming apparatus according to claim 13, further comprising: a latent image writing device that writes an electrostatic latent image onto the image carrier; and a developing device that makes the electrostatic latent image formed on the image carrier to a visible image by a toner, wherein the lubricant applying device is disposed upstream from an electrostatic latent image writing position of the latent image writing device in the moving direction of the image carrier.

15. The image forming apparatus according to claim 14, further comprising a transferring device that transfers the toner image on the image carrier to a sheet that is a recording member.

* * * * *